United States Patent [19]

Morris

[11] Patent Number: 5,600,090

[45] Date of Patent: Feb. 4, 1997

[54] FILTER FOR ELECTRICAL APPARATUS

[76] Inventor: Jonathan Morris, 1692 Wallace St., Vineland, N.J. 08360

[21] Appl. No.: 446,443

[22] Filed: May 22, 1995

Related U.S. Application Data

[63] Continuation of Ser. No. 39,637, Mar. 30, 1993, abandoned.

[51] Int. Cl.$^6$ .................................................... H05K 5/03
[52] U.S. Cl. ................... 174/17 VA; 361/687; 150/154; 150/165; 206/320
[58] Field of Search ..................... 174/17 VA; 361/687; 364/708.1; 220/371; 383/118; 150/154, 165; 206/305, 320, 576

[56] References Cited

U.S. PATENT DOCUMENTS

| | | | |
|---|---|---|---|
| D. 237,754 | 11/1975 | Ray | D3/2 |
| D. 237,755 | 11/1975 | Ray | D37/1 R |
| D. 265,561 | 7/1982 | Cottrett | D14/114 |
| 1,863,130 | 6/1932 | Swaim . | |
| 3,087,524 | 4/1963 | Dolnick | 150/52 |
| 3,166,112 | 1/1965 | Fisher | 150/52 |
| 4,625,784 | 12/1986 | Boroson | 150/52 |
| 4,889,542 | 12/1989 | Hayes | 55/97 |
| 4,922,980 | 5/1990 | Parker | 150/165 |
| 4,932,524 | 6/1990 | Hodson | 206/320 |
| 5,163,870 | 11/1992 | Cooper | 454/184 |
| 5,193,925 | 3/1993 | Foulke | 400/715 |
| 5,202,816 | 4/1993 | DeWilde | 361/384 |

Primary Examiner—Laura Thomas
Assistant Examiner—Paramita Ghosh
Attorney, Agent, or Firm—Beveridge, DeGrandi, Weilacher & Young, L.L.P.

[57] ABSTRACT

A computer dust filter cover comprises an open cell synthetic foam sheet formed into a bonnet-like arrangement by an elastic strap. The cover is readily attached and removed from the computer housing front or side panels to cover the disc slots while the computer is in use and without interfering with the use of the computer. The cover can remain in place when the computer is not in use to protect the interior of the housing and parts therein from contamination by particulates at all times.

1 Claim, 2 Drawing Sheets

FILTER FOR ELECTRICAL APPARATUS

This is a continuation of U.S. application Ser. No. 08/039,637, filed Mar. 30, 1993, now abandoned.

This invention relates to filter covers, and more particularly, to filter covers for electrical apparatus.

BACKGROUND OF THE INVENTION

Covers for electrical and mechanical apparatus typically comprise dust and dirt covers which are made of materials that are impervious to moisture and dust, such as vinyl sheet. While effective, these covers also tend to be restrictive to air flow so that the covers must be removed prior to operating the apparatus, especially electrical apparatus which have openings for cooling. In apparatus such as computers and the like, fans are enclosed within the housing for circulating cooling air over the interior electrical devices which may heat up during operation. The housing also includes louvers through which the fan forces cooling air to flow. It is important in these structures to permit air to flow freely when in use, and thus, the air restrictive dust covers must be removed during operation of the apparatus. Further, such covers tend to enclose the entire apparatus, mandating removal prior to operating the system to permit access to areas such as the keyboard, disc slots and the monitor.

Thus one or more of the housing openings of an electrical apparatus, such as a computer, need to be exposed to the ambient atmosphere during operation of the apparatus. Some of the openings must be exposed to the ambient atmosphere without filtering, for example, the keyboard. However, a need is seen for a dust filter that can be used while a computer system is in operation and that will provide a filtering action against dust particles in the ambient air that can injure delicate and complex parts of the system, such as printed circuit boards and the like.

SUMMARY OF THE INVENTION

According to the present invention a filter cover is provided for an electrical apparatus of the type including a housing enclosing an interior volume in which is located one or more electrical cooling devices for cooling the volume and parts located therein. Such cooling devices operate to flow ambient air through at least one opening in the housing. The filter cover of the invention comprises a sheet of flexible open cell material dimensioned to filter, trap and remove particulates in air or other gas flowing through the material, thereby preventing contamination by particulates of interior parts. An elastic elongated strap is secured to the material, the strap in its normal state being dimensioned so that the material at the strap is pleated or gathered or otherwise made smaller than the panel, such as a printed circuit board, or housing over which it is to be placed. Thus the material and strap form a bonnet-like filter structure having a reduced elastic peripheral dimension of such size and shape such that, when stretched, the structure can be resiliently releaseably secured to the panel or housing that is to be protected from dust.

DESCRIPTION OF THE PREFERRED EMBODIMENTS

Figure 1:
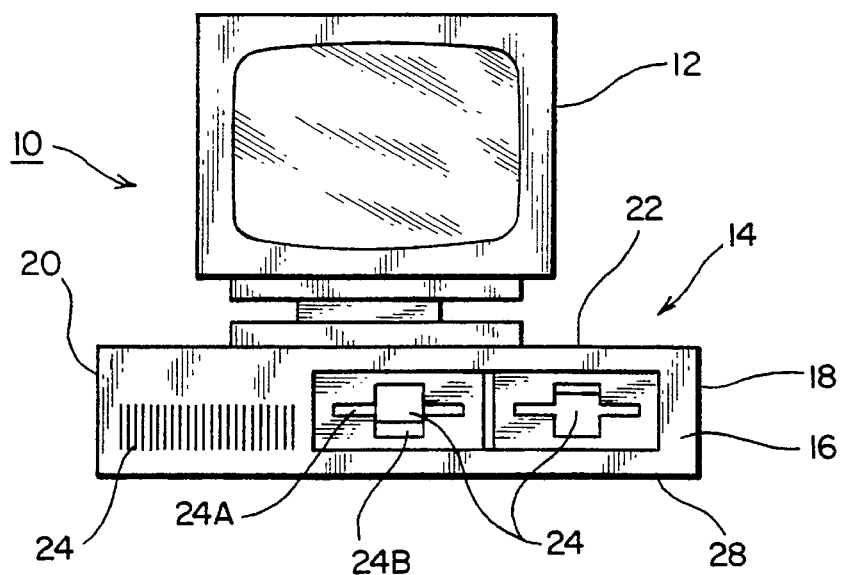
FIG. 1 is a front elevational view of a computer to which a filter cover of the present invention is adapted to be attached.

The invention will be described in conjunction with the Drawing. Referring to FIG. 1, a computer 10 includes a monitor 12 supported on computer housing 14. The housing 14 is representative of commercially available computers which have a wide variety of housing shapes and sizes. For example, some housings are vertical and are referred to as tower styles, the housing standing upright at right angles to the orientation of the housing 14. The present filters can be cut or shaped to fit any particular housing. The housing 14 has a front panel 16 and two side panels 18 and 20, the monitor resting on the top panel 22. The system rests on bottom panel 23.

The front panel 16 has louvers 24 for receiving cooling air therethrough forced into the housing 14 by a cooling fan (not shown) located inside the housing 14. The front panel 16 has a pair of magnetic disc slots 24. The slots have a narrow end region 24A and a central larger region 24B for permitting insertion and removal of a disc. Some computers have disc retaining covers which enclose region 24B when a disc is inserted. Other computers have merely a locking lever. Some slots are for receiving 5.25 inch discs and others for receiving 3.5 inch discs. Some computers lave one slot 24 and others two, as shown. In tower models, the slots are usually located one over the other. Also the disc receiving slots may be in one panel and the louvers in another, different panel of the housing according to the particular computer manufacturer.

The problem with all of these models is that the slots 24 are relatively large and readily admit air flow to the computer interior. While the louvers are used particularly to permit air flow and may have interior filters (not shown), the disc slots can not have such filters, because the filter would interfere with the use of the slot, i.e., restrict insertion of a disc.

To deal with this problem, a filter 30, FIGS. 2–6 is provided. The filter 30 comprises a synthetic, flexible and elastic material which is commercially available as filter sheet 32 having an open cell construction. The sheet 32 is preferably a black foamed synthetic polyester or polyether material. Preferably the sheet is at least 1/16 inch thick and is preferably about 3/16 inch thick. This material is flexible, folds easily and stretches under tension. The cell construction is open to permit air flow therethrough. There are numerous cells in a given tortuous air flow path through the material thickness. For example, there are hundreds of cells per square inch of sheet material and the cells are so arranged that none are aligned in a straight path, thereby forming a highly tortuous air flow path. This tortuous path entraps dust particles from the air flowing to the interior of the housing 14, thereby removing the particles from the air.

Figure 2:
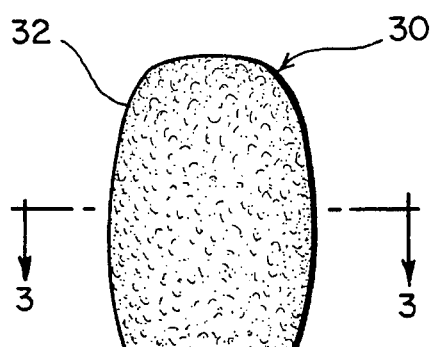
FIG. 2 is a side elevational view of a filter cover according to one embodiment of the present invention in its normal quiescent relaxed state.
Figure 6:
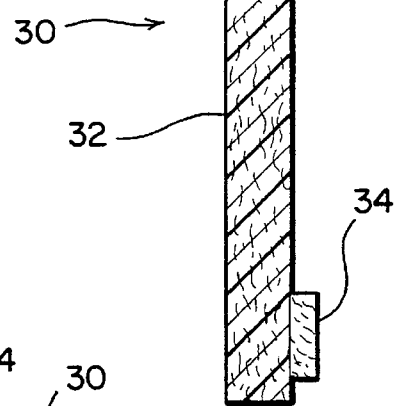
FIG. 6 is a sectional view of the embodiment of FIG. 4 taken along lines 6—6.
Figure 4:
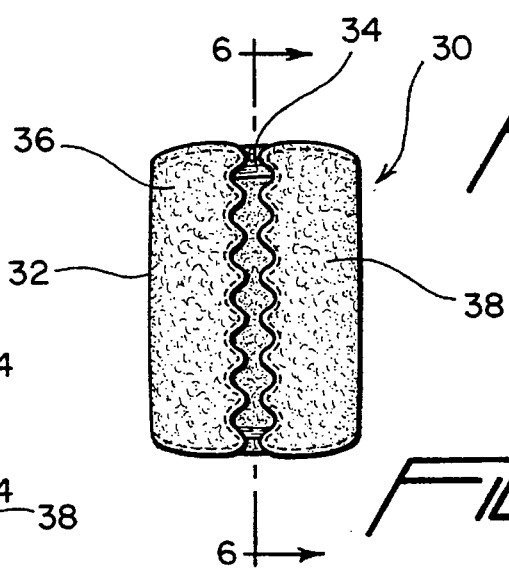
FIG. 4 is a front elevational view of the embodiment of FIG. 2.
Figure 3:
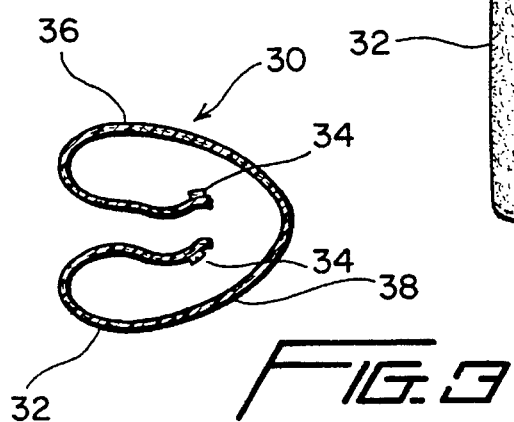
FIG. 3 is a sectional view of the embodiment of FIG. 2 taken along lines 3—3.

In FIGS. 3 and 4, the filter 30 includes an elastic strap 34. The strap 34 is of a rubberized fabric which is also commercially available in ribbon form. The strap 34 is sewn or otherwise secured to the filter material 32 at the peripheral edge of the filter 30 while the filter 30 edges are pleated or gathered thereby. The filter 30, prior to receiving the strap 34, is somewhat rectangular in shape and is of such dimension so as to enclose the front panel 16 of the computer 10 of FIG. 1, and wrap around onto the side panels 18 and 20 and top and bottom panels 22 and 23. The pleats or gathers in the edge of the filter 30 are formed by the strap 34 so as to form a bonnet-like structure. The strap 34 draws the peripheral edges of the filter 30 into an annular reduced region in the quiescent state so in this state the filter 32 appears as shown in FIGS. 2–4. The strap while in ribbon form, is sewn continuously about the edges of the filter material 32.

Figure 5:
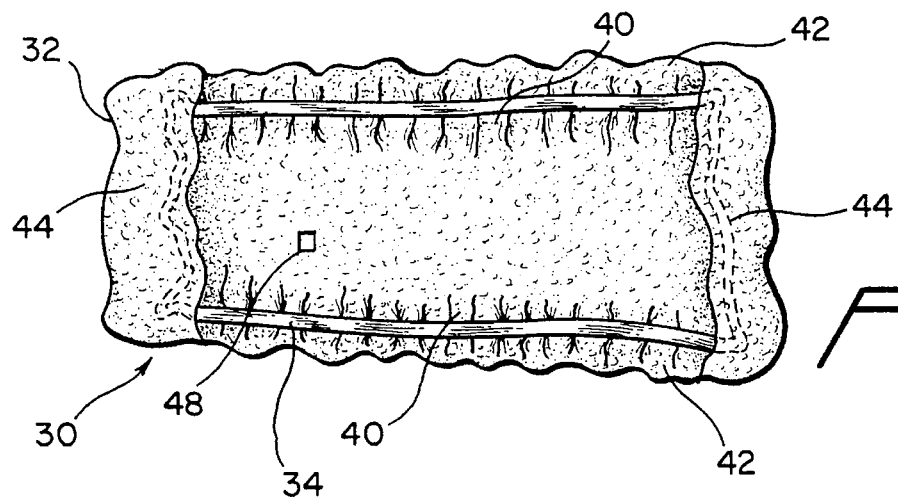
FIG. 5 is an elevational view of the embodiment of FIG. 4 wherein the filter cover is stretched somewhat as it would appear when ready for attachment to the computer of FIG. 1.

In FIG. 3, the filter 30 in the relaxed quiescent state has two ears 36 and 38 lying in juxtaposed relation. The pleats or gathers 40, as best seen in FIG. 5, are drawn together by the natural elastic forces of the elastic strap 34, causing the filter material 32 to assume the shape of FIGS. 2–4. When the filter 30 is expanded for attachment to the housing 14, as shown in FIG. 5, the pleats are elongated somewhat. While the filter material 32 is somewhat elastic, it is not as elastic as the strap 34, thus necessitating the pleats or gathers 40 to allow for expansion of the filter 30 so that it can be elongated to fit over one or more panels of the housing 14. Also, the elastic forces exerted by the strap 34 are much higher than that of the filter material 32, which by itself would be unable to fit over the computer side panels 18, 20, since it normally is supplied in a planar sheet form.

Figure 7:
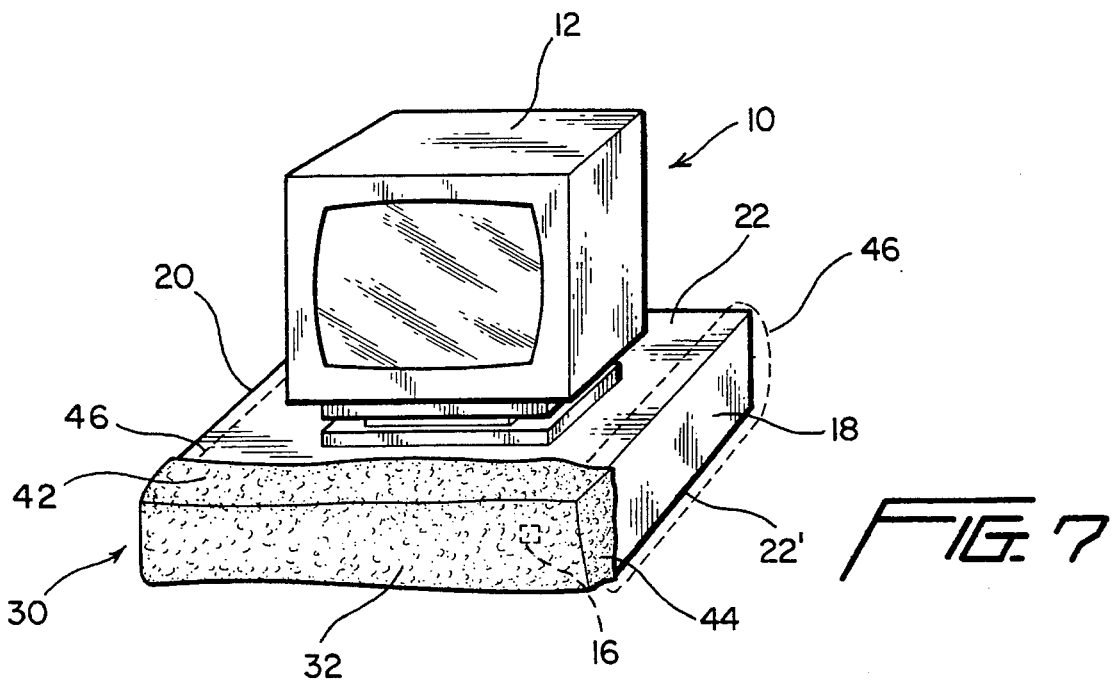
FIG. 7 is an isometric view of the computer of FIG. 1 with the filter cover of the present invention attached.

When attached, the filter 30 appears as shown in FIG. 7. In this embodiment the filter 30 is attached to the front panel 16 of the computer 10. The filter 30 edge regions 42 engage the respective top and bottom housing panels 22 and 23 and edge regions 44 engage the side panels 18 and 20. The strap 34, being adjacent to the edges 42, 44, engages and overlaps the top panel 22, the bottom panel 23 and the side panels 18, 20, releaseably securing the filter 30 in place. While in this embodiment only the front panel is covered (solid lines) the side panels may also be covered by the same filter or a separate filter as shown in dashed lines 46 in FIG. 7. The side panel filters may be required in the event the computer 10 has louvers on these side panels while the disc slots are in the front panels. Also, the filter may be used to cover the rear panel as well and may include slots to allow for the wiring attached to the rear panel of the computer, depending on a given implementation and configuration.

In use, the cover is in place at all times, at least over the louver portion of the housing 14. If the louver portion and the disc slots are in the same panel of the housing 14, the cover is easily temporarily removed. After a disc is inserted or removed from its slot 24, the filter cover 30 is easily reattached to the housing 14 and does not interfere with the use of the computer. Openings 48, as shown in FIG. 5, in the filter cover 30 may be provided to allow the user to observe certain displays provided in some computers, for example, MHz displays that are available on multiple speed computers, especially tower-type units.

While an elastic strap is illustrated herein to attach the filter in place, other media may be used such as hook and loop devices known as Velcro fasteners or other releaseable fasteners. Such other devices may include snap fasteners, hook and loop arrangements other than Velcro and the like. In some instances, such as snap fasteners or hook and loop devices the computer panels may need to be modified to accept the external filter covers and therefore are less desirable than the elastic strap arrangement described herein.

Figure 8:
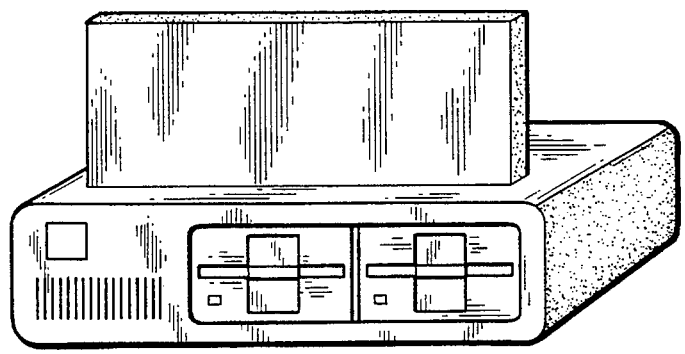
FIG. 8 is a front elevational view of a printed circuit board within a computer housing having a protective cover in accordance with the invention.

FIG. 8 illustrates an alternate embodiment of the invention, wherein the filter material as described hereinabove is employed inside the computer housing to cover a printed circuit board, for example. Again, since the present material allows a free flow of air therethrough, the foam material can remain in place during operation of the computer, protecting printed circuit boards or other parts inside the housing from dust particles, but without hindering cooling of the printed circuit board or other part from cooling fans and the like.

While the described filter covers are for use in ambient atmosphere using air as the gas, it is apparent that the filter cover can be used in any gaseous medium for filtering that medium according to a given implementation. Other parts can be protected and equivalent materials used as will be known to those skilled in the art. While the present invention has been described in terms of particular embodiments, various substitutions can be made and are meant to be included herein. The invention is only to be limited by the appended claims.

What is claimed is:

1. A filter cover for a part of a computer, said computer having a housing having an opening for a flow of air through said housing and at least one printed circuit board within said housing to be protected from dust particles in said flow of air, said cover comprising a sheet of flexible open cell foamed elastic synthetic material whose cells are dimensioned and arranged to trap and remove dust in air flowing through said material, and means to secure said material to said printed circuit board.

\* \* \* \* \*